United States Patent
Frank

(10) Patent No.: US 6,719,282 B2
(45) Date of Patent: Apr. 13, 2004

(54) JIG ASSEMBLY FOR INSTALLING CABINET DRAWER SLIDES

(76) Inventor: Richard A. Frank, 5263 Bud La., Casco, MI (US) 48064

( * ) Notice: Subject to any disclaimer, the term of this patent is extended or adjusted under 35 U.S.C. 154(b) by 107 days.

(21) Appl. No.: 10/109,238

(22) Filed: Mar. 28, 2002

(65) Prior Publication Data

US 2002/0163115 A1 Nov. 7, 2002

Related U.S. Application Data

(63) Continuation-in-part of application No. 09/711,395, filed on May 7, 2001, now abandoned.

(51) Int. Cl.⁷ .................................... B25B 1/20
(52) U.S. Cl. .................. 269/37; 269/60; 269/289 R; 269/309; 269/904
(58) Field of Search .................. 248/354.7; 408/115 R, 408/103, 108, 115 B; 254/122, 126, 133 R; 269/37, 60, 289 R, 309, 904

(56) References Cited

U.S. PATENT DOCUMENTS

| | | |
|---|---|---|
| 5,064,319 A | 11/1991 | Ericksen |
| 5,364,060 A * | 11/1994 | Donovan et al. ........... 248/588 |
| 5,507,607 A | 4/1996 | Ericksen |
| 5,593,137 A | 1/1997 | Johnson |
| 5,743,684 A | 4/1998 | Rex |
| 5,807,036 A | 9/1998 | Lostlen |
| 5,813,803 A | 9/1998 | Sommerfeld |
| 5,941,621 A | 8/1999 | Boulay et al. |
| 6,042,206 A | 3/2000 | Bowyer et al. |

* cited by examiner

Primary Examiner—Robert C. Watson
(74) Attorney, Agent, or Firm—Gifford, Krass, Groh, Sprinkle, Anderson & Citkowski, P.C.

(57) ABSTRACT

A jig assembly for use in installing drawer slides at specified locations of first and second sides of a cabinet, the cabinet also including at least a bottom extending in interconnecting fashion with the first and second sides. The jig assembly includes first and second substantially elongated supports, each exhibiting at least one lengthwise extending slot and a substantially flattened end surface. The first and second supports also include secondary slide support surfaces defined at each of opposite extending edges thereof. A scissor mechanism includes first and second pairs of elongated and pivotally interconnecting members. Associated ends of the elongated members interconnect within slots extending within the first and second supports in vertically displaceable and adjustable fashion and so that the end support surfaces are arrayed in oppositely facing and extensible fashion. A ratchet sub-assembly of the scissor mechanism defines a substantially midpoint interconnection between the pair of elongated members, the ratchet sub-assembly permits incremental extension of the first support relative to the second support and so that the drawer slide is supported in substantially level and extending fashion upon a selected support surface prior to being secured to an associated side of the cabinet.

12 Claims, 5 Drawing Sheets

JIG ASSEMBLY FOR INSTALLING CABINET DRAWER SLIDES

REFERENCE TO CO-PENDING APPLICATIONS

The present application is a continuation-in-part of U.S. patent application Ser. No. 09/711,395, filed May 7, 2001 now abandoned, for a Cabinet Craft Jig.

BACKGROUND OF THE INVENTION

1. Field of the Invention

The present invention relates generally to jig assemblies. More particularly, the present invention discloses a jig assembly for assisting in installing drawer slides associated with an existing cabinet, such a jig assembly providing a durable, reversible and correct guide for supporting and affixing the drawer slides in a time efficient and precisely aligned manner.

2. Description of the Prior Art

Jig assemblies are generally known in the art, the purpose for which being to provide supporting and or guiding assistance during the installation of such as hardware components of slide or support structure. One known example in the prior art is set forth in U.S. Pat. No. 5,593,137, issued to Johnson, which teaches a bi-directional elevating and rack-attached support device for use in the removal, installation and repair of rack-mounted items such as electronic telecommunications modules.

The support device of Johnson further includes such as a support platform adapted to be removably mounted to at least a pair of vertically arranged and spaced apart elements having a plurality of apertures therein and forming a rack for mounting modules thereto. A support mechanism is operatively supported by the support platform and is bi-directionally adjustable. The support mechanism includes such as a work platform and a scissor lift structure operably secured between the support platform and the work platform for achieving the bi-directional motion.

A carrying handle and level indicator (mounted within a front panel) are employed for assisting in repositioning adjustment and leveling of the support platform. Applicant further notes that Johnson discloses the use of an elongated adjustment screw, which is in communication with the pivoting end connections of each scissor lift, as well as extending through the front panel section of the device main body. Rotation of the screw in first or second directions results in the raising or lowering of the worktop as necessary to align the supported modules with respect to the desired vertical location of the support rack.

SUMMARY OF THE PRESENT INVENTION

The present invention discloses a jig assembly associated with an existing cabinet, such a jig assembly providing a durable, reversible and correct guide for supporting and affixing the drawer slides in a time efficient and precisely aligned manner. The jig assembly is, in particular, useful in installing drawer slides in easily reversible fashion and at specified locations of first and second sides of a cabinet, the cabinet also including at least a bottom extending in interconnecting fashion with the first and second sides.

The jig assembly includes first and second substantially elongated supports, each including a pair of lengthwise extending slots and exhibiting a substantially flattened end surface. The first and second supports also include secondary slide support surfaces defined at each of opposite extending edges thereof and which, upon laying the jig assembly in substantially horizontally laying fashion along the bottom of the cabinet, provides a minor incremental spacing, typically ¼" or ½", from the bottom and for installing a lower most pair of drawer slides.

A scissor mechanism includes first and second pairs of elongated and pivotally interconnecting members. Associated ends of the elongated members interconnect within slots extending within the first and second supports in vertically displaceable and adjustable fashion and so that the end surfaces of the support members are arrayed in oppositely facing and extensible fashion.

The scissor mechanism includes a ratchet sub-assembly defining a substantially midpoint interconnection between the pair of elongated members. The ratchet sub-assembly includes a pawl mechanism defined as a circularly extending array of individual slots defined within a face of a first selected elongated member. A tab is secured to a second selected elongated member in inwardly biasing fashion and projects through a window defined in the second member so that it is urged in incrementally engageable fashion within a selected one of the slots defined in the first member. In use, the ratchet assembly permits incremental extension of the first support relative to the second support and so that the drawer slide is supported in substantially level and extending fashion upon a selected support surface and prior to being secured to an associated side of the cabinet.

A further feature of the jig assembly is the provision of an attachment plate including an arcuate projecting finger from a first location thereof. Upon positioning of the first and second supports in an endwise supported fashion upon the cabinet bottom, the projecting finger is engageable with a selected one of a plurality of notches defined in lengthwise extending fashion along one or both of the elongated supports. A through bore is defined through a further location of the plate and provides a guide for drilling an aperture within an associated side of the cabinet, such as is known for receiving a tab for supporting extending ends of a shelf or ledge.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
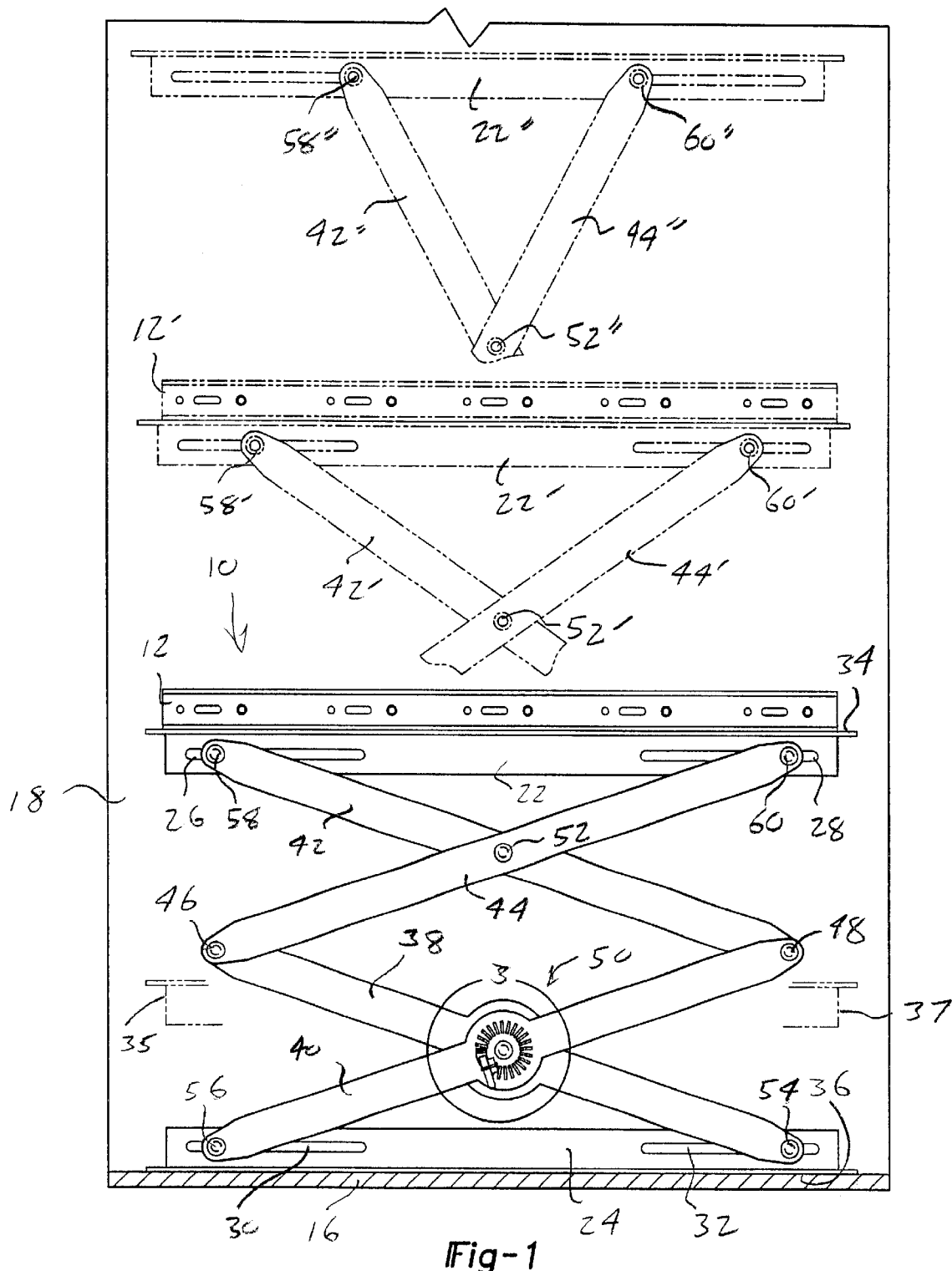
FIG. 1 is a first operational plan view according to the present invention and illustrating the jig assembly in a first operative engagement position within an associated cabinet, as well as illustrating in phantom second and third vertically and incrementally extended positions for locating and supporting a drawer slide prior to securing to a side of the cabinet.

Referring now to FIG. 1, a jig assembly is illustrated generally at 10 according to a preferred embodiment of the present invention. As previously described, the jig assembly assists in the installation of drawer slides, such as shown at 12 and 14 in FIGS. 1 and 2, associated with an existing cabinet, and provides a durable, reversible and correct guide for supporting and affixing the drawer slides in a time efficient and precisely aligned manner.

Figure 2:
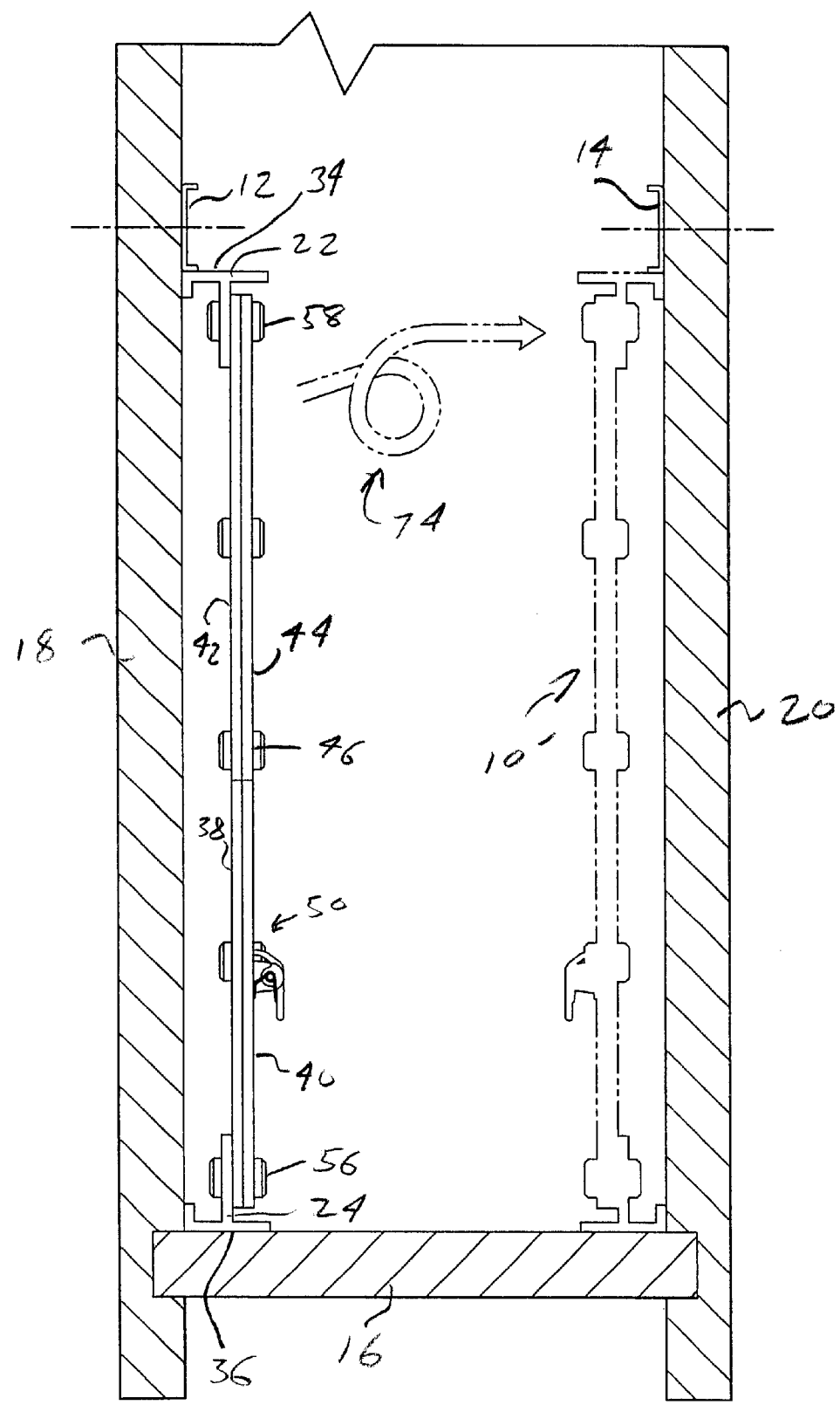
FIG. 2 is a second and 90 degree rotated side view of the jig assembly substantially as illustrated in FIG. 1 and further evidencing its reversible nature for securing drawer slides to both of inwardly and opposingly facing sides of the cabinet.
Figure 3:
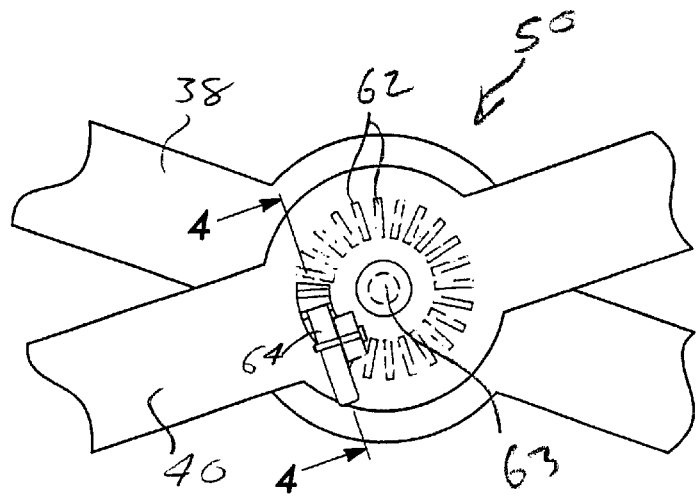
FIG. 3 is an enlarged sectional view of the ratchet sub-assembly as also illustrated in FIG. 1 according to the present invention.
Figure 4:
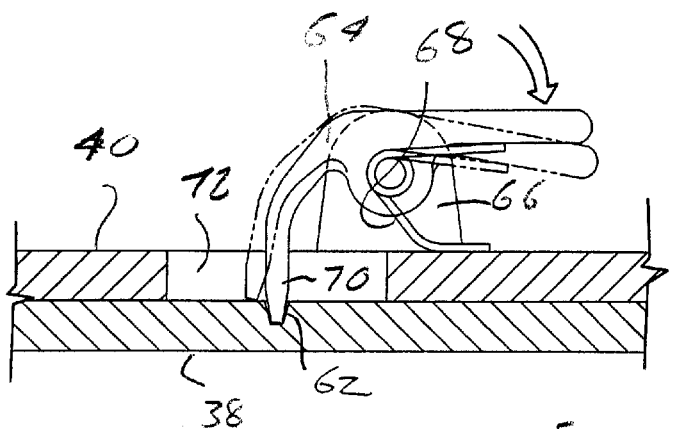
FIG. 4 is a side cutaway view, taken along line 4—4 of FIG. 3, and illustrating the inwardly biasing nature of the extending tab associated with the interengaging pawl mechanism according to the present invention.
Figure 5:
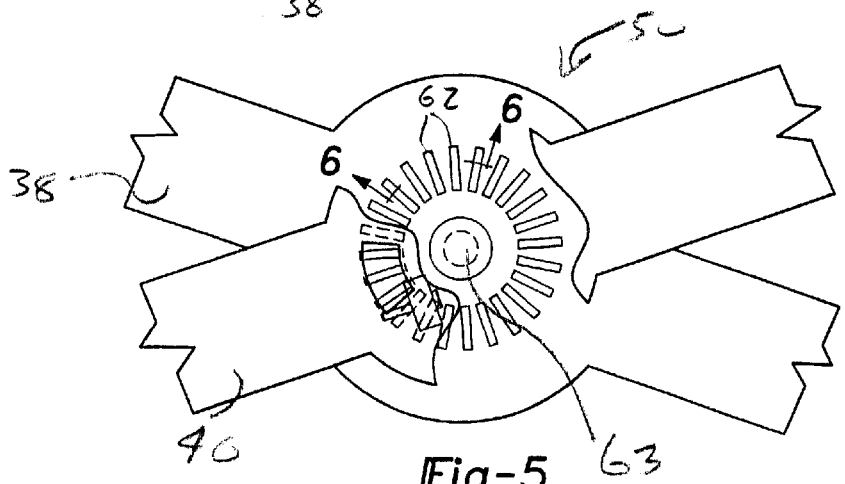
FIG. 5 is a view substantially similar to that shown in FIG. 4 and in which a mid-point portion of a selected elongated member is cut away to further illustrate the extending circular array of slots defining a component of the pawl mechanism.
Figure 6:
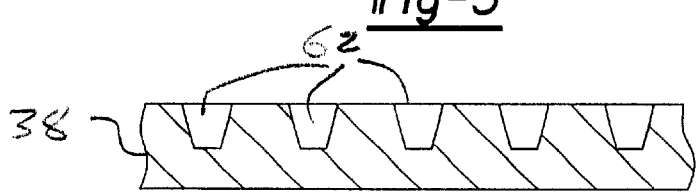
FIG. 6 is a cutaway view taken along line 6—6 of FIG. 5 and showing the cross wise configuration of the slots.

As again shown in FIGS. 1 and 2, the cabinet typically includes at least a bottom 16 extending in interconnecting fashion with first 18 and second 20 sides. Referring again to FIG. 1, it illustrates a first operational plan view according to the present invention in which the jig assembly 10 is established a first operative engagement position within the associated cabinet 12, as well as illustrating in phantom second and third vertically and incrementally extended positions for locating and supporting the drawer slides 12 and 14 prior to their securing to the respective sides 18 and 20 of the cabinet 12.

In particular, and referring again to FIGS. 1 and 2, the jig assembly 10 includes a first elongated support 22 and a second elongated support 24. Each of the supports is constructed of a material such as metal, synthetic resin or plastic, or other suitable composite which exhibits the necessary properties of durability and resilience.

As also best shown in FIGS. 1 and 2, each of the elongated supports 22 and 24 also includes a pair of spaced apart and lengthwise extending slots defined within and along a body of each support (see at 26 and 28 for first support 22 and at 30 and 32 for second support 24). It is also contemplated that a single elongated slot could be employed in extending fashion along the axial length of each of the elongated supports and, as will be subsequently explained with reference to the associated scissor mechanism and ratchet sub-assembly, the slots assist in the incremental extension of elongated supports and so that a substantially flattened end surface 34 associated with the first elongated support 22 is movable in directions both towards and away from an oppositely facing and flattened end surface 36 associated with the second elongated support 24.

A scissor mechanism includes the provision of at least one, and preferably two, pairs of elongated and pivotally interconnecting members. In particular, and referring again to FIGS. 1 and 2, a first pair of elongated members 38 and 40 and a second interconnected pair of elongated members 42 and 44 are provided.

The hinged connections established between the pairs 38 & 40 and 42 & 42 of elongated members are illustrated at 46 and 48. Additional and midpoint hinged connections are shown at 50 (referenced generally) and 52 for each of the respective pair 38 and 40 of elongated members. As will be further described, the midpoint hinged connection 50 is further by the ratchet sub-assembly and in order to incrementally extent, as well as retract, the first elongated support 22 in directions towards and away from the second elongated support 24.

Finally, additional hinged and translatable connections are defined between the oppositely extending ends of pairs of elongated members and the associated slots defined within the elongated supports. In particular, hinged connection 54 is established between an extending end of elongated member 38 and slot 32, whereas hinged connection 56 is likewise established between an extending end of elongated member 40 and slot 30 (both in second and lowermost disposed elongated support 24). Likewise, hinged connection 58 is established between an extending end elongated member 42 and slot 26 (in elongated support 22) and hinged connection 60 between extending end of elongated member 44 and slot 28.

It is contemplated that the hinged connections, such as again referenced by the fixed pivotal connections established between the pairs of pivotally interconnecting members 46, 48, 52, as well as the combined pivotal and translatable connections 54, 56, 58 and 60, may be accomplished in any manner known in the art. This may include the use of such as rivets or bolt and screw fasteners. It is however preferred that at least a $\frac{1}{16}$" tolerance be provided in the pivotable and translatable slot connections 54–60 and in order to facilitate free movement within the slots.

Referring again to FIG. 1, as well as to FIGS. 3–6 in succession, a more detailed explanation is given of the pawl mechanism established by the general midpoint hinged connection 50 of the first pair of elongated scissor members 38 and 40. In particular, and referring again to both the phantom illustration of FIG. 3 as well as the cutaway of FIG. 5, an enlarged sectional view illustrates the generally midpoint connection of the first 38 and second 40 elongated members and in which a circularly extending array of individual slots 62 are defined at the midpoint location and within a face of a first elongated member 38. The midpoint of the first elongated member 38 is further configured in a generally circular fashion, as shown, and so as to accommodate the placement of the circular array of the incrementing slots 62 and pivoting connection about a central axis or pin 63. As further best shown in FIG. 6, a cross wise configuration of the slots 62 evidences their configuration and, in accordance with one preferred embodiment, the arrangement of the slots 62 will facilitate incremental extension of the jig assembly by $\frac{1}{32}$" graduations.

Arranged in opposingly overlaying and abutting fashion at the midpoint connection 50 is a likewise central configuration of the second 40 elongated member. A tab 64 is secured to an opposite face of the second elongated member 40, such as securing in a hingedly controlled fashion to a column support 66 (see FIG. 4) affixed to the exposed facing side of the second member 40. A coil spring 68 is provided and serves to bias an arcuate extending configuration 70 of the tab 64 (see again in FIG. 4) and so that the tab projects through a window 72 defined in the second member 40. The tab 64 is urged, by virtue of the spring 68 (or other suitable biasing component such as a spring tensioning and elbow shaped element), in incrementally engageable fashion through the window 72 and within a selected one of said slots 62 defined in the circular array within the first member 38 as best shown in the side cutaway view of FIG. 4.

Referring back to FIG. 1, it is evident as to how the pawl mechanism, in combination with the structure of the jig assembly previously disclosed, facilitates the incremental extension of the jig from its initial and lower most position (in one preferred variant typically defining a displacement of 4½" between the oppositely facing and flattened end surfaces 34 and 36 of the first 22 and second 24 elongated supports and as shown by partial phantom references 35 and 37), to additional and incrementing extension, such as illustrated by the positioning of the elongated support at 22' and by virtue of the action of the various pivot points to permit the location and installation of a slide 12' at an intermediate height location upon the side 18 of the cabinet 12. Referring to the upper most extending position of the jig assembly in FIG. 1, this is shown by the elongated member at position 22" and which in a preferred variant can correspond to a fully extending displacement of approximately 28" between the elongated supports 22 and 24.

In this manner, the jig assembly 10 is capable of being extended or retracted as desired to facilitate the desired fixed location and installation of the drawer slides in the manner desired. Referring again to FIG. 2, the 90 degree rotated side view of the jig assembly, substantially as illustrated in FIG. 1, further evidences its reversible nature, see arrow 74, for applying in a reversed and mirror fashion (see at 10') to the second associated side 20 of the cabinet and in order to secure the second drawer slide 14 to in opposingly facing manner to that initially located at 12 on the first side 18 of the cabinet 12. In this manner, individual pairs of drawer slides, such as again at 12 and 14, are capable of being quickly installed once the correct displacement of the elongated supports 22 and 24 of the jig assembly 10 is established by its incremental extension and whereby the exposed ends surface 36 of the elongated support 24 is supported upon the bottom 16 of the cabinet and the oppositely facing surface 34 of the elongated support 22 provides a support for the drawer slides.

Figure 7:
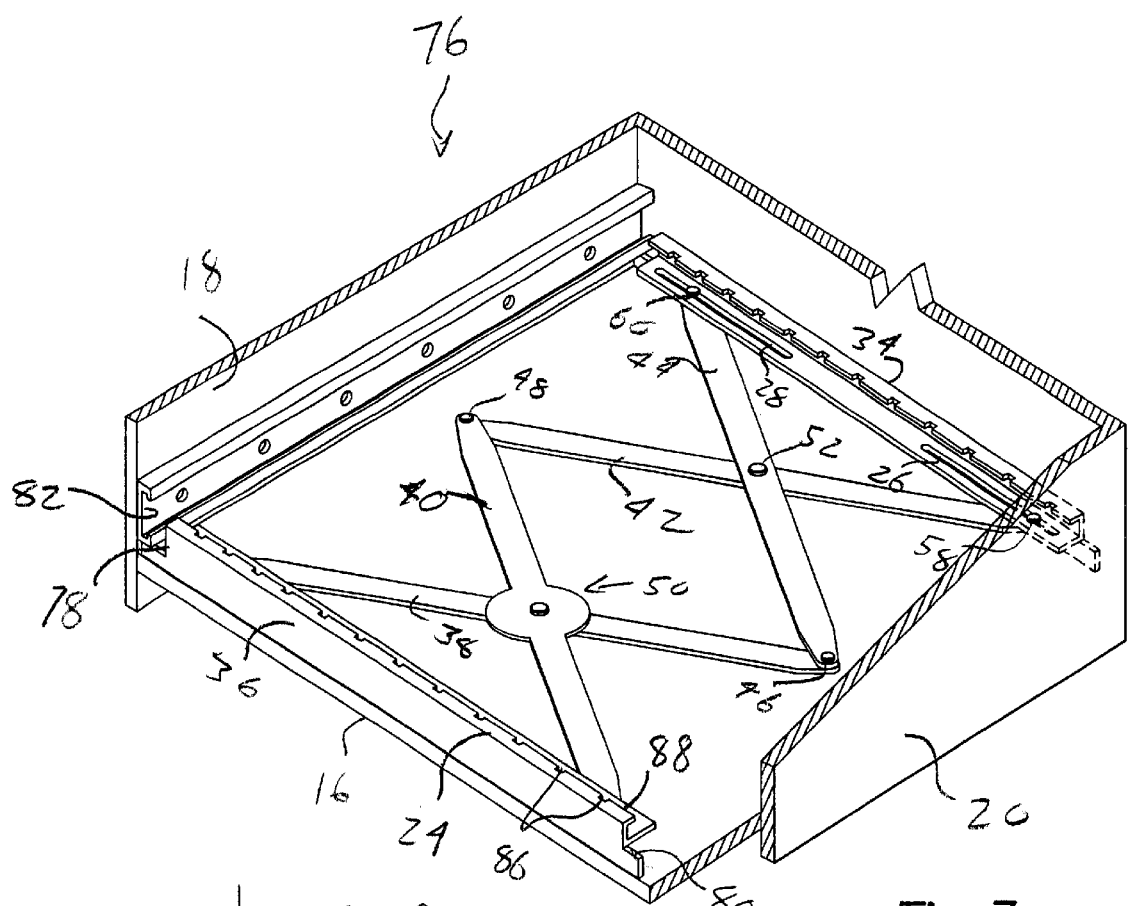
FIG. 7 is a perspective view illustrative of a further application of the jig assembly and in which it is support in incrementally extended fashion along the bottom of the cabinet and so that a selected pair of secondary support surfaces is employed to locate and support the drawer slide for securing to lower most side wall locations of the cabinet.

Referring now to FIG. 7, a perspective view is illustrated at 76 of a further application of the jig assembly and in which it is support in incrementally extended fashion along the bottom 16 of the cabinet. In this variant, first and second selected pairs of secondary support surfaces are employed at opposite ends of each elongated support and so that the supports are arranged in supported and incrementally extended fashion along the bottom of the cabinet.

Figure 8:
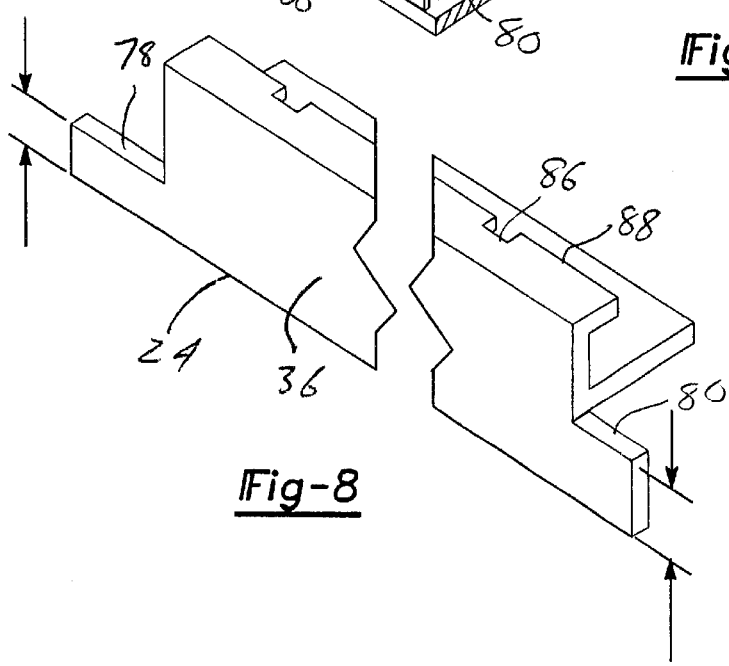
FIG. 8 is a reduced length view of a selected elongated support and illustrating the first and second oppositely extending and incrementally offset secondary support surfaces.

Referring to the reduced length view of the selected elongated support 24 as shown in FIG. 8, a first secondary support surface 78 is located at a first end and a further secondary support surface 80 at an opposites second end. Both the first and second elongated supports 22 and 24 are configured in identical fashion with secondary support surfaces at opposite ends thereof and so that a first defined pair of secondary support surfaces at first ends of the elongated supports establishes a first vertically extending and incremental distance from the cabinet bottom 16 and a second defined pair of secondary support surfaces at second ends of the elongated supports establishes a second vertically extending and incremental distance.

In the preferred embodiment, the identical pair of spaced apart and secondary support surfaces 78 defined such as a first ¼" inch offset from the bottom, provides a guide and support for affixing a lower most drawer slide (see at 82 in FIG. 7) to the selected side 18 of the cabinet. The oppositely extending and spaced apart pair of secondary support surfaces (such as again referenced at 80 for selected support 24) may in the preferred embodiment define an incrementally spaced support ½" from a bottom of the cabinet and for providing a slightly higher clearance for aligning, supporting and installing the associated drawer slides.

Figure 9:
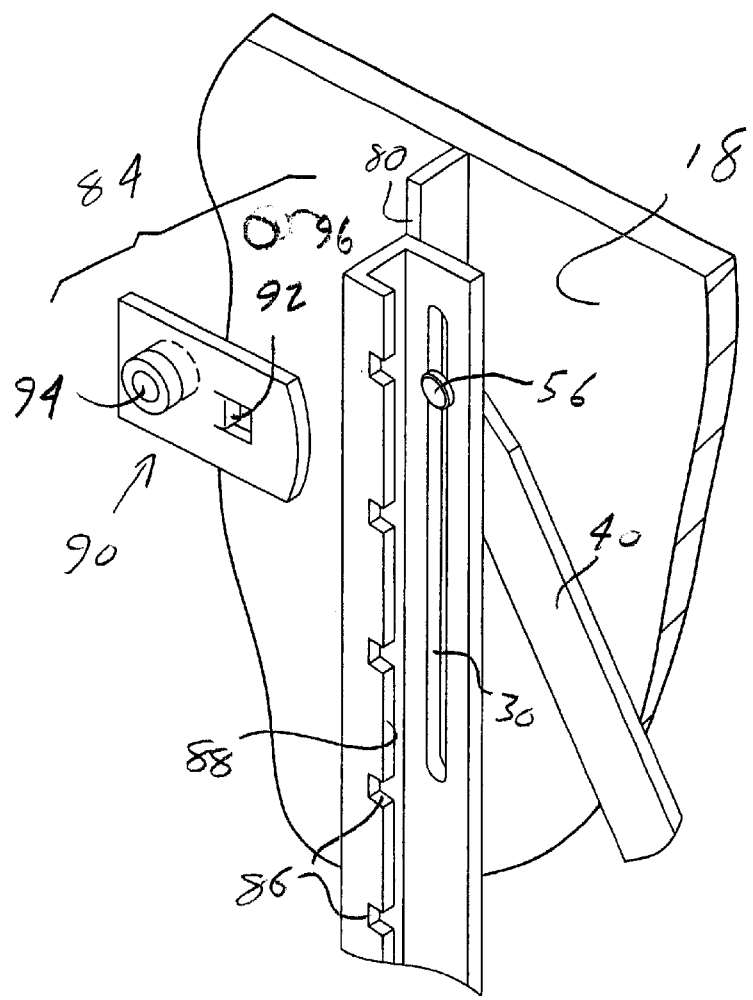
FIG. 9 is a partially exploded view which illustrates a further application of the jig assembly in which it is supported in endwise extending fashion upon the cabinet base and in which an attachment plate is employed to provide a guide for drilling apertures within the cabinet side walls.
Figure 10:
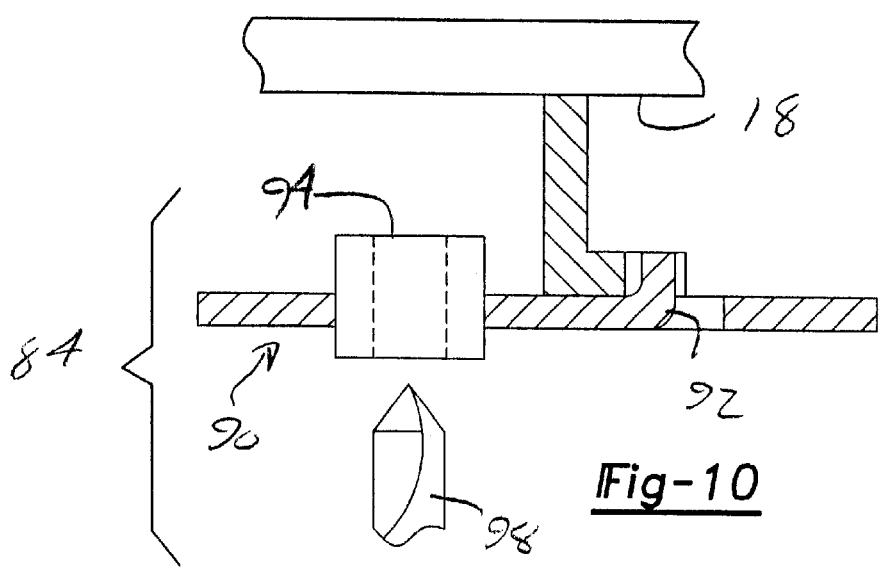
FIG. 10 is a cutaway view of the attachment plate in the position generally shown in FIG. 9 and which establishes a guide for drilling an aperture within the associated side of the cabinet.

A final embodiment and application of the jig assembly 10 is illustrated at 84 in reference to FIGS. 9 and 10 and in which the jig assembly is supported in endwise extending fashion upon the cabinet base and so that a selected one of the elongated supports, such as again at 24, is positioned to extend in generally vertical fashion from the cabinet bottom and upwards along a selected side wall 18. A plurality of notches, see at 86, are defined in incrementally spaced fashion, such as at 1½" inch or other suitable intervals, and along a selected exposed and spatially extending edge 88 of the associated support, again at 24.

Upon positioning the support(s) in the end wise and vertically extending fashion, an attachment plate 90 is employed to provide a guide for drilling apertures within the cabinet side walls. This is accomplished through the configuration of the attachment plate 90 which includes an arcuate finger 92 (such as an inwardly and 90 degree bent portion of the plate 90) extending from a first location of the plate. Upon the arcuate finger 92 being located and engageable with a selected one of the notches 86, a through bore 94 defined through a further location of the plate 90 provides a guide for drilling an aperture, see at 96 in FIG. 9, and within an associated side 18 of the cabinet. Referring again to FIG. 10, a representation is made at 98 of a suitable drill bit for performing the drilling of apertures at vertically extending intervals along the sides of the cabinet and for such conventional use as the insertion of tabs or the like for supporting removable and adjustable shelves.

Having described my invention, additional preferred embodiments will become apparent to those skilled in the art to which it pertains and without deviating from the scope of the appended claims. In particular, it is envisioned that the elongated slots arranged within the supports can be substituted by merely hingedly and pivotally securing the associated extending ends of the elongated members of the scissor mechanism, the elongated members in turn including telescopically extensible portions to facilitate the incremental extensions and retractions necessary to elevate the jig assembly to affix the drawer slides.

It is also envisioned that the pawl mechanism described herein can be reconfigured in other ways to accommodate incremental and ratcheting upward extension of the jig assembly to its fully extensible height. Such pawl mechanisms including the provision of conventional ratchet wheels and/or the use of known tab and slot structures built into the scissor mechanism.

I claim:

1. A jig assembly for use in installing drawer slides at specified locations of first and second sides of a cabinet, the cabinet also including at least a bottom extending in interconnecting fashion with the first and second sides, said jig assembly comprising:

first and second substantially elongated supports, each exhibiting a substantially flattened end surface;

a scissor mechanism interconnecting said first and second supports in vertically displaceable and adjustable fashion and so that said respective end surfaces are arrayed in oppositely facing manner, said scissor mechanism further comprising at least one pair of elongated members; and a ratchet sub-assembly associated with said scissor mechanism and permitting incremental extension of said first support relative to said second support, said ratchet sub-assembly defining a substantially mid-point interconnection between said pair of elongated members, the drawer slide being supported in substantially level and extending fashion upon a selected support prior to being secured to an associated side of the cabinet.

2. The jig assembly as described in claim 1, said scissor mechanism further comprising first and second individual pairs of elongated and pivotally interconnecting members.

3. The jig assembly as described in claim 1, each of said first and second supports further comprising at least one lengthwise extending slot defined therein, selected ends of said elongated members of said scissor mechanism pivotally and translatably engaging within said slots.

4. The jig assembly as described in claim 3, further comprising first and second pairs of individual and lengthwise extending slots associated with each of said elongated supports and respectively engaging associated ends of said elongated members.

5. The jig assembly as described in claim 1, said ratchet sub-assembly further including a pawl mechanism comprising:

a circularly extending array of individual slots defined within a face of a first selected elongated member; and a tab secured to a second selected elongated member, said tab projecting through a window defined in said second member and being urged in incrementally engageable fashion within a selected one of said slots defined in said first member.

6. The jig assembly as described in claim 5, said tab further comprising an arcuate extending configuration, a coil spring biasingly urging said tab towards said selected slot.

7. The jig assembly as described in claim 1, each of said first and second elongated supports further comprising at least one secondary slide support surface defined at a selected and longitudinally extending edge thereof.

8. The jig assembly as described in claim 7, whereupon said first and second supports being arranged in supported and incrementally extended fashion along the bottom of the cabinet, a first pair of said secondary slide support surfaces at first ends of said elongated supports establishing a first vertically extending and incremental distance from the bottom, a second pair of said secondary slide support surfaces at second ends of said elongated supports establishing a second vertically extending and incremental distance from the bottom.

9. The jig assembly as described in claim 1, each of said first and second elongated supports further comprising a plurality of notches defined therein in elongate extending direction.

10. The jig assembly as described in claim 9, further comprising an attachment plate, an arcuate projecting finger from a first location of said plate and which, upon positioning of said first and second supports in an endwise supported fashion upon the cabinet bottom, being engageable with a selected one of said notches, a through bore defined through a further location of said plate and providing a guide for drilling an aperture within an associated side of the cabinet.

11. A jig assembly for use in installing drawer slides at specified locations of first and second sides of a cabinet, the cabinet also including at least a bottom extending in interconnecting fashion with the first and second sides, said jig assembly comprising:

first and second substantially elongated supports, each exhibiting at least one lengthwise extending slot and a substantially flattened end surface, each of said first and second elongated supports further comprising at least one secondary slide support surface defined at a selected and longitudinally extending edge thereof;

a scissor mechanism including first and second pairs of elongated and pivotally interconnecting members, associated ends of said elongated members interconnecting within said slot associated with said first and second supports in vertically displaceable and adjustable fashion and so that said respective end surfaces are arrayed in oppositely facing manner; and a ratchet sub-assembly associated with said scissor mechanism and defining a substantially midpoint interconnection between said pair of elongated members, said ratchet sub-assembly permitting incremental extension of said first support relative to said second support, the drawer slide being supported in substantially level and extending fashion upon a selected support surface prior to being secured to an associated side of the cabinet.

12. A jig assembly for use in installing drawer slides at specified locations of first and second sides of a cabinet, the cabinet also including at least a bottom extending in interconnecting fashion with the first and second sides, said jig assembly comprising:

first and second substantially elongated supports, each exhibiting a substantially flattened end surface, each of said first and second elongated supports further comprising a plurality of notches defined therein in elongate extending direction;

an attachment plate, an arcuate projecting finger from a first location of said plate and which, upon positioning of said first and second supports in an endwise supported fashion upon the cabinet bottom, being engageable with a selected one of said notches, a through bore defined through a further location of said plate and providing a guide for drilling an aperture within an associated side of the cabinet;

a scissor mechanism interconnecting said first and second supports in vertically displaceable and adjustable fashion and so that said respective end surfaces are arrayed in oppositely facing manner; and a ratchet sub-assembly associated with said scissor mechanism and permitting incremental extension of said first support relative to said second support, the drawer slide being supported in substantially level and extending fashion upon a selected support prior to being secured to an associated side of the cabinet.

* * * * *